US006346310B1

(12) United States Patent
Naoe et al.

(10) Patent No.: US 6,346,310 B1
(45) Date of Patent: Feb. 12, 2002

(54) MAGNETIC RECORDING MEDIUM

(75) Inventors: Koji Naoe; Tatsuo Ishikawa; Hiroaki Takano, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/600,833

(22) PCT Filed: Jul. 31, 1998

(86) PCT No.: PCT/JP98/03427

§ 371 Date: Dec. 19, 2000

§ 102(e) Date: Dec. 19, 2000

(87) PCT Pub. No.: WO99/38158

PCT Pub. Date: Jul. 29, 1999

(30) Foreign Application Priority Data

Jan. 21, 1998 (JP) ............................................ 10-009895
Mar. 12, 1998 (JP) ............................................ 10-061124

(51) Int. Cl.$^7$ ............................................. G11B 5/735
(52) U.S. Cl. ........................ 428/141; 428/323; 428/328; 428/329; 428/336; 428/425.9; 428/473.5; 428/694 BB; 428/900
(58) Field of Search ........................ 428/694 BB, 323, 428/328, 329, 336, 141, 425.9, 473.5, 900

(56) References Cited

U.S. PATENT DOCUMENTS

| 3,995,089 A | * 11/1976 | Hartmann et al. | .......... 428/336 |
| 5,607,747 A | * 3/1997 | Law et al. | ................... 428/141 |
| 5,989,680 A | * 11/1999 | Wakawa et al. | ............ 428/141 |

FOREIGN PATENT DOCUMENTS

JP        10-097786        * 10/1999

* cited by examiner

*Primary Examiner*—Stevan A. Resan
(74) *Attorney, Agent, or Firm*—Stroock & Stroock & Lavan LLP

(57) ABSTRACT

Disclosed is a magnetic recording medium comprising a magnetic layer on a surface of a flexible support and a backcoat layer on the opposite surface, characterized in that the backcoat layer comprises a granulated oxide consisting of titanium oxide, α-iron oxide or a mixture thereof and carbon black in the weight ratio ranging from 60/40 to 90/10, and further comprises a binder in an amount ranging from 10 to 40 parts by weight with respect to 100 parts by weight of the total amount of the granulated oxide and carbon black. The magnetic recording medium of the present invention is characterized in that both the running durability and electromagnetic characteristics are excellent.

11 Claims, 1 Drawing Sheet

MAGNETIC RECORDING MEDIUM

BACKGROUND OF THE INVENTION

1. Field of the Invention

The present invention relates to a high-density magnetic recording medium excellent in both of electromagnetic characteristics and running durability.

2. Description of Related Art

Magnetic recording media have been widely used as tapes for recording tapes, video tapes, floppy discs and the like. Recently, it is generally required to provide magnetic recording media having especially excellent electromagnetic characteristics. For example, magnetic recording media used as audio tapes for music recording and reproducing have been required advanced reproduction ability of fundamental tones, while magnetic recording media used as video tapes have been required advanced reproduction ability of original pictures.

In addition to such excellent electromagnetic characteristics, magnetic recording media have been also required to exhibit good running performance and running durability. To improve the running durability, abrasives and lubricants are generally added to magnetic layers. In order to materialize excellent running durability, it is required to increase their added amounts to some extent. However, if the added amounts are increased, the filling density of a ferromagnetic powder is necessarily lowered. Especially, if the added amount of lubricant is increased, the binder is easily plasticized, the durability of the magnetic layer inversely tends to be lowered. In addition, if an abrasive having large particle diameter is used in order to materialize excellent durability, the abrasive is easily projected excessively on the surface of the magnetic layer. All of these lead to lowering of the electromagnetic characteristics. In addition, such methods have been developed as to select a certain binder and add the same. However, all of those methods have not been attempted to solve the problems, such as lowering of dispersibility and deteriorating of running property (Japanese Unexamined Patent Publication (KOKAI) Showa No.61-148,626, Japanese Unexamined Patent Publication (KOKAI) Showa No.61-190,717, Japanese Unexamined Patent Publication (KOKAI) Showa No.62-82,510, Japanese Unexamined Patent Publication (KOKAI) Heisei No.1-251,416, Japanese Unexamined Patent Publication (KOKAI) Heisei No.1-267,829, Japanese Unexamined Patent Publication (KOKAI) Heisei No.3-44,819, Japanese Examined Patent Publication (KOKOKU) Heisei No.6-64,726, Japanese Unexamined Patent Publication (KOKAI) Heisei No.6-96,437, Japanese Examined Patent Publication (KOKOKU) Heisei No.7-21,851).

Therefore, such attempts have been developed in order to improve the running durability as to provide base projections not on a magnetic layer but on a backcoat layer, and to make surface rough by addition of coarse carbon particles having a particle diameter equal to or higher than 0.1 $\mu$m. However, if the surface of the backcoat layer is roughened by such methods, when the magnetic recording medium wound up is preserved and processed, the backcoat layer contacts with the magnetic layer under pressure, thereby transfer of unevenness of the backcoat layer to the magnetic layer, so-called, "reverse transfer" occurs. As a result, the electromagnetic characteristics may disadvantageously be lowered.

To solve such a problem of "reverse transfer", such an attempt has been developed as to make the surface of a backcoat layer smooth. However, if the surface of the backcoat layer is smoothened, friction coefficient to guides of a reproduction machine such as a VTR increases, thereby the running stability becomes lowered. Therefore, in order to lower the friction coefficient, such an attempt has been developed as to add a relatively large amount of a lubricant to a backcoat layer. However, if a large amount of a lubricant is used, another problem causes that the guides stain by increased adherence of the surface of the backcoat layer. As described, in order to prepare magnetic recording media having excellent electromagnetic characteristics and good running stability, further improvements to a backcoat layer are required.

On the other hand, recently, magnetic recording media are required to record signals in still more high-density. Therefore, recently, it tends to make the magnetic layer thinner in order to improve outputs. For example, as for particulate magnetic recording media, such a technique has been practically used that a nonmagnetic layer and a magnetic layer are coated in this order on a flexible support by simultaneous multilayer coating, and thereby the magnetic layer as an upper layer is made thinner (Japanese Examined Patent Publication (KOKOKU) Heisei No.4-71,244). In addition, also in vapor deposited (ME) tapes, the output is made higher by making the thickness of the magnetic layer within the range of from 0.15 to 0.2 $\mu$m.

It is required to reduce the thickness of a layer not only for a magnetic layer but also for each layer constituting magnetic recording media. Because recent media for computer storage, especially, tapes for small backup systems typified by D8 and DDS are required to have higher capacity, it is necessary to make the whole thickness of the medium thinner. In order to make the thickness of magnetic recording medium thinner, it has been conventionally attempted to make a thinner flexible support and a nonmagnetic layer provided between a flexible support and a magnetic layer of a particulate magnetic recording medium. However, if a flexible support was made thinner as having a thickness below a certain range, running durability was lowered. If a nonmagnetic layer was made thinner, output lowered, error rate increased and dropout increased.

A backcoat layer cannot be omitted for keeping good running property in small backup systems such as D8 and DDS adopting helical scan recording systems. In addition, if a backcoat layer is made thinner, the backcoat layer is peeled off in repeated running due to lowering the adhesion strength to the flexible support, or projections on the surface of the backcoat layer transfer to the magnetic layer, thereby the output becomes lowered. Especially, for magnetic recording media for DDS-2 and DDS-3, an aramid base is used as a flexible support in order to increase electromagnetic characteristics and running durability. However, falling and scraping of the backcoat layer at the end surface of the edges in repeated running are remarkable compared with a polyester base conventionally used, such as polyethylene terephthalate (PET) or polyethylene naphthalate (PEN). Moreover, by increasing the Young's modulus in a width direction of a flexible support, the strength in a width direction of a thin magnetic recording medium is kept, so that the running durability is secured. However, it has such a problem that parts of the end surface of the backcoat layer (that is, the end surface formed by slitting) are fallen when the magnetic layer is prepared by slitting.

As described above, the magnetic recording medium satisfying both of electromagnetic characteristics and running durability could not be provided in prior art. Especially, in today when the whole thickness of the magnetic recording medium is required to be thinner, further improvements are required for enhancing electromagnetic characteristics and running durability.

Therefore, it is an object of the present invention to solve the problems of the prior art, and to provide a magnetic recording medium exhibiting good running durability, high output and high capacity.

SUMMARY OF THE INVENTION

The present inventors have diligently studied to solve aforementioned problems, and as a result, they found that a magnetic recording medium having good running durability and excellent electromagnetic characteristics can be provided by incorporating titanium oxide or α-iron oxide, as an inorganic powder into a backcoat layer, in an amount larger than that of carbon black and decreasing the amount of a binder.

That is, the present invention provides a magnetic recording medium comprising a magnetic recording medium on a surface of a flexible support, and a backcoat layer on the opposite surface, characterized in that the backcoat layer contains a granulated oxide consisting of titanium oxide, α-iron oxide or a mixture thereof (in this specification, "granulated oxide" entirely means titanium oxide, α-iron oxide or a mixture thereof) and carbon black in a weight ratio of from 60/40 to 90/10, further contains a binder in an amount of from 10 to 40 parts by weight with respect to 100 parts by weight of the total weight of the granulated oxide and the carbon black.

As the granulated oxide for the backcoat layer of the magnetic recording medium of the present invention, for example, a spherical oxide having a particle diameter of from 0.01 to 0.2 μm, and an acicular oxide having a length of the major axis of from 0.05 to 0.3 μm and a length of the minor axis of from 0.01 to 0.05 μm can be used. In addition, as carbon black for the backcoat layer, for example, a carbon black having a particle diameter of from 0.01 to 0.3 μm can be used.

In addition, the backcoat layer preferably contains a polyurethane resin as a binder. Particularly preferable resins are reaction products of a diol and an organic diisocyanate and the above diol consists of those which contain a short chain diol having a cyclic structure in an amount of from 17 to 40% by weight and a long chain diol having an ether linkage in an amount of from 10 to 50% by weight, respectively, with respect to the polyurethane resin wherein the above ether linkage in the long chain diol is contained in an amount of from 1.0 to 5.0 mol/g with respect to the polyurethane resin.

The thickness of the whole magnetic recording medium preferably ranges from 3 to 7.5 μm.

The flexible support of the present invention preferably has the surface roughness (Ra) on the backcoat layer side equal to or less than 4 nm. In addition, it is preferable that the flexible support is an aramid base and the adhesion strength between the backcoat layer and the flexible support is equal to or higher than 80 g/(8 mm width). A nonmagnetic layer comprising a nonmagnetic inorganic powder and a binder may be provided between the flexible support and the magnetic layer.

Figure 1:
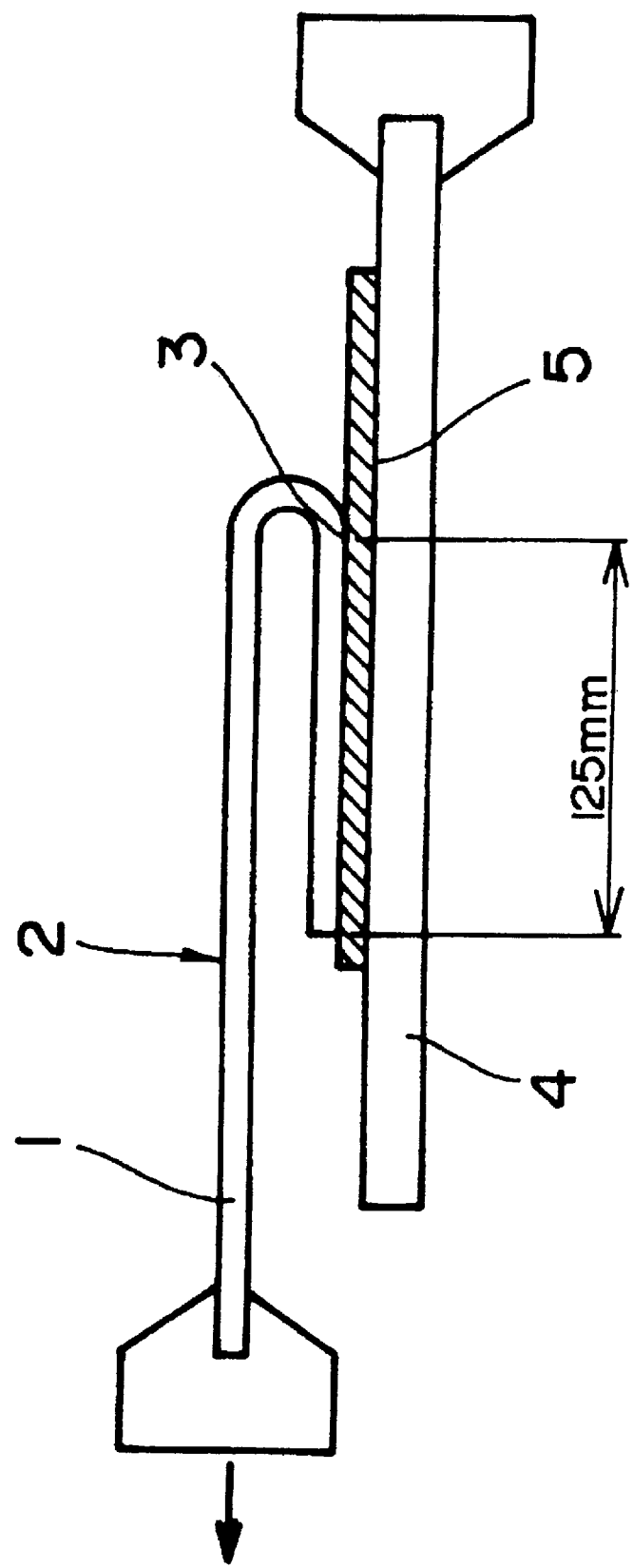
FIG. 1 illustrates a method of an adhesion strength measurement test between a backcoat layer and a support.

In this figure, 1 represents a magnetic recording medium, 2 represents a backcoat layer side of the magnetic recording medium, 3 represents a peeling line, 4 represents a soft metal plate and 5 represents a tape with an adhesive on both sides.

MODE FOR CARRYING OUT OF THE INVENTION

The magnetic recording medium of the present invention widely includes those comprising a magnetic layer on a surface of a flexible support and a backcoat layer on the opposite surface. Accordingly, the magnetic recording medium of the present invention also includes those having layers other than the magnetic layer and backcoat layer. For example, it may comprise a nonmagnetic layer containing a nonmagnetic powder, a soft magnetic layer containing a soft magnetic powder, a second magnetic layer, a cushion layer, an overcoat layer, an adhesion layer, a protective layer and the like. These layers can be provided at the appropriate position as to be able to exert its functions effectively.

Preferable one as a magnetic recording medium of the present invention is such a magnetic layer as to comprise a nonmagnetic layer containing a nonmagnetic inorganic powder and a binder between a flexible support and amagnetic layer. As for the thicknesses of the layers, for example, the thickness of the magnetic layer may range from 0.03 to 1 μm, preferably from 0.05 to 0.5 μm, more preferably from 0.05 to 0.3 μm and the thickness of the nonmagnetic layer may range from 0.5 to 3 μm, preferably from 0.8 to 3 μm. The thickness of the nonmagnetic layer is preferably thicker than that of the magnetic layer.

In addition, a magnetic recording medium comprising two magnetic layers is also preferable. In this case, for example, the thickness of an upper layer may range from 0.2 to 2 μm, preferably from 0.2 to 1.5 μm, and the thickness of a lower layer may range from 0.8 to 3 μm. It is to be noted that in the medium comprising a magnetic layer alone, the thickness usually ranges from 0.1 to 5 μm, preferably from 0.1 to 3 μm, more preferably from 0.1 to 1.5 μm. In addition, in the medium comprising a soft magnetic layer between the flexible support and the magnetic layer, for example, the thickness of the magnetic layer may range from 0.03 to 1 μm, preferably from 0.05 to 0.5 μm, and the thickness of the soft magnetic layer may range from 0.8 to 3 μm.

It is to be noted that the magnetic layer may be not only a so-called particulate magnetic layer containing the ferromagnetic powder as mentioned above in the binder in dispersion but also a thin film type magnetic layer formed by a vapor deposition or sputtering. In the case of such a thin film magnetic layer, its thickness is selected within the range of from 0.05 to 0.3 μm, more preferably from 0.1 to 0.2 μm.

The thickness of the backcoat layer provided to the magnetic recording medium of the present invention preferably ranges from 0.05 to 1.0 μm. Among this range, it is more preferable to be within the range of from 0.05 to 0.5 μm and it is particularly preferable to be within the range of from 0.1 to 0.3 μm.

The granulated oxide used in the backcoat layer of the magnetic recording medium of the present invention is any of titanium oxide, α-iron oxide oramixture thereof. Such titanium oxide and α-iron oxide can be those usually used. In addition, shapes of the particles are not especially limited. In the case using a spherical titanium oxide or α-iron oxide, that having a particle diameter of from 0.01 to 0.2 μm, more preferably from 0.01 to 0.1 μm is desirable from the viewpoint of securing the film strength of the backcoat layer itself. In addition, in the case using an acicular titanium oxide or α-iron oxide, that having an acicular ratio of from 2 to 20 is appropriate and that having an acicular ratio of from 3 to 10 is more preferable. In addition, that having a length of a major axis of from 0.05 to 0.3 μm and a length of a minor axis of from 0.01 to 0.05 μm is preferable.

At least a part of the surface of the granulated oxide may be modified to the other compound or covered with the other compound. In particular, those in which at least a part of the surface of the granulated oxide is covered with at least a compound selected from $Al_2O_3$, $SiO_2$, $TiO_2$, $ZrO_2$, $SnO_2$, $Sb_2O_3$ and $ZnO_2$, particularly, at least a compound selected from $Al_2O_3$, $SiO_2$ and $ZrO_2$, are preferable from the viewpoint of having excellent dispersibility in the binder. Such a granulated oxide can be obtained using a method in which titanium oxide or α-iron oxide is synthesized followed by treatment depositing or covering the other compound as mentioned above on its surface, or using a method in which titanium oxide or α-iron oxide is co-precipitated with at least a compound selected from $Al_2O_3$, $SiO_2$, $TiO_2$, $ZrO_2$, $SnO_2$, $Sb_2O_3$ and $ZnO_2$.

In addition, such a granulated oxide can be obtained from commercially available products. DPN-245, DPN-250, DPN-250BX, DPN-270BX, DPN-550BX, DPN-550RX, TF-100 and TF-120 manufactured by Toda Kogyo Corporation; TTO-51A, TTO-51B, TTO-51C, TTO-53B, TTO-55A, TTO-55B, TTO-55C, TTO-55D, TTO-55N, TTO-55S, TTO-S-1, TTO-S-2, TTO-M-1, TTO-M-2, TTO-D-1, TTO-D-2, SN-100, E270 and E-271 manufactured by Ishihara Sangyo Co. Ltd.; STT-4D, STT-30D, STT-30 and STT-65C manufactured by Titan Kogyo K. K.; MT-100F, MT-100S, MT-100T, MT-150W, MT-500B, MT-500HD and MT-600B manufactured by Tayca Corporation; $TiO_2P_{25}$ manufactured by Nippon Aerosil Co. Ltd.; Super titania manufactured by Showa Denko Co. Ltd. and the like can be exemplified.

In addition, as for the carbon black used in the backcoat layer, those usually used in magnetic recording media can be also widely used. For example, furnace black for rubbers, thermal for rubbers, black for coloring, acetylene black or the like can be used. In order not to transfer unevenness of the backcoat layer to the magnetic layer, the particle diameter of carbon black is preferably equal to or less than 0.3 μm. Particularly preferable particle diameter is from 0.01 to 0.1 μm. In addition, a carbon black amount used in the backcoat layer is preferably within the range in which an optical transmittance concentration (transmittance value measured with TR-927 manufactured by Macbeth Co. Ltd.) is equal to or less than 1.2.

If the granulated oxide is spherical, carbon black having a particle diameter equal to or less than 0.3 μm is used, thereby a backcoat layer having such an appropriate thickness without reverse transfer can be obtained.

In addition, if the granulated oxides are acicular, it is rather preferable that carbon black having a particle diameter equal to or less than 0.1 μm is used from the viewpoint that a backcoat layer having such an appropriate thickness without reverse transfer can be easily obtained.

From the viewpoint of improving running durability, it is advantageous to use two kinds of carbon black different in an average particle size. In this case, it is preferable to combine the primary carbon black having an average particle size ranging from 0.01 to 0.04 μm with the second carbon black having an average particle size ranging from 0.05 to 0.3 μm. The content of the second carbon black appropriately ranges from 0.1 to 10 parts by weight and preferably ranges from 0.3 to 3 parts by weight with respect to 100 parts by weight of the total amount of the granulated oxide and the primary carbon black. It is preferable that the pH of the primary carbon black ranges from 2 to 10, the moisture ratio ranges from 0.1 to 10% and the tap density ranges from 0.1 to 1 g/ml. The specific surface area of the carbon black ranges from 100 to 500 $m^2$/g, preferably from 150 to 400 $m^2$/g, and the DBP oil absorption amount ranges from 20 to 400 ml/100 g, preferably from 30 to 200 ml/100 g.

Specific examples of the primary carbon black used in the present invention include BLACK PEARLS 2000, 1300, 1000, 900, 800, 880, 700 and VULCAN XC-72 manufactured by Cabot Corporation; #3050B, 3150B, 3250B, #3750B, #3950B, #950, #650B, #970B, #850B and MA-600 manufactured by Mitsubishi Chemical Corp.; CONDUCTEX SC, RAVEN 8800, 8000, 7000, 5750, 5250, 3500, 2100, 2000, 1800, 1500, 1255 and 1250 manufactured by Columbia Carbon Co. Ltd.; and Ketjen black EC manufactured by Lion Akzo Co., Ltd.

In addition, the specific surface area of the second carbon black ranges from 5 to 100 $m^2$/g, preferably from 5 to 30 $m^2$/g, and the DBP oil absorption amount ranges from 20 to 120 ml/100 g, preferably from 30 to 110 ml/100 g. #55, #55 and #35 manufactured by Asahi Carbon Co. Ltd.; RAVEN 450manufactured by Columbia Carbon Co. Ltd.; Thermax MT manufactured by Kern Calp Co. Ltd. and the like can be exemplified.

The weight ratio of the granulated oxide and carbon black ranges from 60/40 to 90/10, more preferably from 70/30 to 80/20. As mentioned above, a backcoat layer having good dispersibility and a smooth surface can be provided by incorporating the granulated oxide in an amount larger than that of the carbon black. A paint for forming a backcoat layer having such a composition has higher thixotropy than that of a conventional paint for forming a backcoat layer mainly containing carbon black. Accordingly, coating by an extrusion method, a gravure method and the like can be done in a high concentration. By coating such a paint having a high concentration, a backcoat layer having high adhesion strength to a support and high dynamics strength can be provided in spite of thin film thickness.

In addition, if a paint for forming a backcoat layer is used in a high concentration, even if an undercoat layer mainly containing a low-molecular polyester is formed between a backcoat layer and a flexible support, the bleed of the low-molecular polyester to the surface of the backcoat layer can be suppressed. Therefore, drawbacks to adhesion and running caused by the bleed can be effectively avoided, which are usually indicated as problems in the case of providing an undercoat layer. Accordingly, the adhesion strength between the backcoat layer and the support can be controlled within the desirable range by forming an adhesive undercoat layer.

However, it is not necessarily required to form the undercoat layer. The adhesion strength can be improved by decreasing a difference in the interface energy between the flexible support and the backcoat layer by using a vinyl chloride resin or a urethane resin as a binder of a paint for forming the backcoat layer to adjust its ratio or by using cyclohexanone as a main solvent. The adhesion strength between the flexible support and the backcoat layer in the present invention can be adjusted within the desirable range by properly selecting and combining these means.

If a paint for forming a backcoat layer containing a granulated oxide in an amount larger than that of carbon black as mentioned above are used, the amount of the binder used can be reduced because of a good adhesive property of an inorganic powder to the binder. The amount of the binder used is selected from the range of from 10 to 40 parts by weight with respect to 100 parts by weight of the total amount of the granulated oxide and the carbon black, more preferably, it ranges from 20 to 32 parts by weight. The backcoat layer thus formed has higher film strength and lower surface electric resistance. Since the backcoat layer has such excellent functions, the magnetic recording medium of the present invention has better running durability and more excellent electromagnetic characteristics than usual ones.

As for the binder for the backcoat layer of the present invention, thermoplastic resins, thermosetting resins, reactive resins and the like conventionally publicly known can be used. As for preferable binders, vinyl chloride resins, vinyl chloride-vinyl acetate resins, fibrin based resins such as nitrocellulose, fenoxy resins and polyurethane resins can be exemplified. Among these, it is more preferable to use vinyl chloride resins, vinyl chloride-vinyl acetate resins and polyurethane resins because the hardness of the backcoat layer become similar to the hardness of the magnetic layer, thereby back transfer can be reduced.

Particularly preferable binders are polyurethane resins which can be obtained by a reaction of a diol with an organic diisocyanate. The diol contains a short chain diol having a cyclic structure in an amount of from 17 to 40% by weight and a long chain diol having an ether linkage in an amount of from 10 to 50% by weight based on the polyurethane resin, wherein the ether linkage in the long chain diol is contained in an amount of from 1.0 to 5.0 mol/g with respect to the polyurethane resin. The details of this polyurethane resin will be explained in the followings.

The above-mentioned short chain diol is that having a molecular weight of from 50 to less than 500, more preferably from 100 to 300. Specific examples include cyclohexanone-1,4-diol, cyclohexanone-1,4-dimethanol, bisphenol A, hydrogenated bisphenol A, bisphenol S, bisphenol P and ethylene oxides thereof, propylene oxide adducts, aromatic or alicyclic diols such as cyclohexane dimethanol, cyclohexane diol or the like.

The above-mentioned long chain diol is that having a molecular weight of from 500 to 5000. Specific examples include ethylene oxide adducts or propylene oxide adducts of bisphenol A or hydrogenated bisphenol A.

Preferable short chain diols and long chain diols are those represented by the following formula (1);

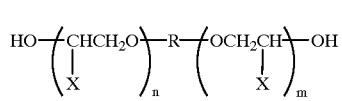

(1)

In the case of short chain diols, m and n are selected as to have a molecular weight of from 50 to less than 500. It generally ranges from 0 to 3. In addition, in the case of long chain diols, m and n are selected as to have a molecular weight of from 500 to 5000. It generally ranges from 3 to 24, preferably from 3 to 20, more preferably from 4 to 15. X preferably represents a hydrogen atom or a methyl group, more preferably a methyl group. It is to be noted that all of Xs in brackets with m and n are not necessarily the same ones, and they may include hydrogen atoms and methyl groups together.

Preferable ones among the short chain diols represented by formula (1) are bisphenol A, hydrogenated bisphenol A, ethylene oxide or propylene oxide adducts thereof. Preferable ones as long chain diols are diols having a molecular weight of from 500 to 5000 which are derived from bisphenol A or hydrogenated bisphenol A. Particularly preferable ones are polypropylene oxide adducts of bisphenol A.

The content of the short chain diol ranges from 17 to 40% by weight, preferably from 20 to 30% by weight based on the polyurethane resin. The content of the long chain diol ranges from 10 to 50% by weight, preferably from 30 to 40% by weight.

Ether groups accompanied by the long chain diol exist in an amount of from 1.0 to 5.0 mmol/g, more preferably from 2.0 to 4.0 mmol/g. Thereby, those having excellent adsorption to a powder and good dispersivility can be obtained. Moreover, it has excellent solubility to a solvent.

Any diols other than the short chain diol and long chain diol can be used together. Specific examples include aliphatic diols such as ethylene glycol, 1,3-propylene diol, 1,2-propylene glycol, 1,4-buthane diol, 1,5-pentane diol, 1,6-hexane diol, 2,2-dimethyl propane diol, 1,8-octane diol, 1,9-nonane diol, diethylene glycol and the like, ethylene oxides such as N-diethanol amine or propylene oxide adducts.

As for the organic diisocyanate compound to be reacted, aromatic diisocyanates such as 2,4-trylene diisocyanate, 2,6-trylene diisocyanate, xylene-1,4-diisocyanate, xylene-1,3-diisocyanate, 4,4'-diphenylmethane diisocyanate, 4,4-diphenylether diisocyanate, 2-nitrodiphenyl-4,4'-diisocyanate, 2,2'-diphenylpropane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxy diphenyl-4, 4'-diisocyanate or the like, aliphatic diisocyanate such as lysine diisocyanate, alicyclic diisocyanate such as isophorone diisocyanate, hydrogenated trylene diisocyanate, hydrogenated diphenylmethane diisocyanate or the like can be exemplified.

Because the polyurethane resin obtained by the reaction has a part of a cyclic structure, a backcoat layer prepared with them has enhanced strength, glass transition temperature and durability. Moreover, if a branched methyl is introduced, the dispersibility will be improved because solubility to a solvent increases.

Tg of the polyurethane resin ranges from −20 to 150° C., preferably from 20 to 120° C., further preferably from 50 to 100° C.

Irrespective of the cyclic structure of the long chain diol which is either aliphatic or aromatic, it is preferable to prepare the binder composition while optimizing the Tg of the coated film so that the Tg ranges from 50 to 150° C., preferably from 70 to 100° C. and the Tg of the coated film is equal to a calender processing temperature ±30° C. to make calender molding property compatible with strength of the coated film.

The binder of the backcoat layer is usually hardened using a polyisocyanate hardening agent. The amount of the hardening agent used ranges from 0 to 150 parts by weight, preferably from 0 to 100 parts by weight, further preferably from 0 to 50 parts by weight with respect to 100 parts by weight of the polyurethane resin.

Hydroxyl groups contained in the polyurethane resin is preferably from 3 to 20 per a molecule, preferably from 4 to 5 per a molecule. If the content is less than 3 per a molecule, the strength of the coated film tends to be lowered because reactivity with a polyisocyanate hardening agent decreases. In addition, if the content is more than 20, dispersibility and solubility to a solvent tend to be lowered.

In order to adjust the content of hydroxyl groups in the polyurethane resin, such a compound can be used as to have three hydroxyl groups in a molecule. In particular, trimethylol ethane, trimethylol propane, trimerit acid anhydride, glycerin, pentaerythritol, hexane triol, branched polyesters and polyether esters containing three or more hydroxyl groups in a molecule which can be obtained from dibasic acid as a glycol component in which a polyester polyol described in Japanese Examined Patent Publication (KOKOKU) Heisei No.6-64726 is used as a raw material can be exemplified. Tri-functional compounds are preferable.

The polyurethane resin preferably contains at least one polar group selected from —$SO_3M$, —$OSO_3M$, —COOM, —$PO_3MM'$, —$OPO_3MM'$, —NRR', —$N^+RR'R''COO^-$ wherein each of M and M' independently represents a hydrogen atom, an alkali metal, an alkali-earth metal or an ammonium salt, and each of R,R' and R'' independently represents an alkyl group having a carbon number of from 1 to 12, and especially preferable are —$SO_3M$ and —$OSO_3M$. The amount of these polar groups preferably ranges from $1\times10^{-5}$ to $2\times10^{-4}$ eq/g, especially preferably from $5\times10^{-5}$ to $1\times10^{-4}$ eq/g. Thereby, it becomes easy to disperse a powder uniformly.

The number average molecular weight of the polyurethane resin preferably ranges from 5,000 to 100,000, more preferably from 10,000 to 50,000, especially preferably from 20,000 to 40,000. Thereby, solubility to a solvent can be secured as well as those excellent in strength of a coated film and durability can be obtained.

Cyclic structures of the polyurethane resin influence rigidity, and ether groups contribute to flexibility. The polyurethane resins as mentioned above have high solubility, large inertial radius (molecular extent) and good powder dispersibility. In addition, they have both characteristics of hardness (high Tg and high Young's modulus) and toughness (elongation) of the polyurethane resin itself as well.

Any components other than the granulated powder, carbon black and binder can be properly incorporated into the backcoat layer of the magnetic recording medium of the present invention. For example, if a fatty acid is contained, an increase of the friction coefficient during repeatedly running can be suppressed while keeping the strength. In addition, an increase of the friction coefficient can also be suppressed by incorporating a fatty acid ester and an abrasive having the Mohs' scale of hardness equal to or higher than 8 to improve sliding durability. Moreover, an increase of the friction coefficient can also be suppressed by incorporating an aromatic organic oxidation compound and a titanium coupling agent to improve dispersibility and strength. In addition, a transfer can be also decreased by suppressing an increase of the friction coefficient by incorporation of an organic powder.

As examples of fatty acids which can be added, monobasic fatty acids having a carbon number of from 8 to 24 can be exemplified. Among them, monobasic fatty acids having a carbon number of from 8 to 418 are preferred. As specific examples of these, lauric acid, caprylic acid, myristic acid, palmitic acid, stearic acid, behenic acid, oleic acid, linoleic acid, linolenic acid, elaidic acid and the like can be exemplified. The amount of the fatty acid added ranges from 0.1 to 5 parts by weight, preferably from 0.1 to 3 parts by weight with respect to 100 parts by weight of the total amount of the granulated oxide and carbon black.

As examples of fatty acid esters, such mono-fatty acid esters or di-fatty acid esters or tri-fatty acid esters can be exemplified as consisting of monobasic fatty acids having a carbon number of from 10 to 24 which may contain an unsaturated bond or bonds or may be branched, and any of monohydric, dihydric, trihydric, tetrahydric, pentahydric and hexahydric alcohols having a carbon number of 2 to 12 which may contain an unsaturated bond or bonds or may be branched. As specific examples of these, butyl stearate, octyl stearate, amyl stearate, iso-octyl stearate, octyl myristate, butoxyethyl stearate, anhydrosorbitan monostearate, anhydrosorbitan distearate and anhydrosorbitan tristearate can be exemplified. The amount of the fatty acid ester added ranges from 0.1 to 5 parts by weight, preferably from 0.1 to 3 parts by weight with respect to 100 parts by weight of the total amount of the granulated powder and carbon black.

As abrasives having the Mohs' scale of hardness equal to or higher than 8, α-alumina, chromium oxide, artificial diamond, carbon modified boron nitride (CBN) and the like can be exemplified. Among these, it is preferable to use those having an average particle diameter equal to or less than 0.2 μm and a particle size equal to or less than the thickness of the backcoat layer. In addition, it is preferable that the height of projections from the surface of the backcoat layer is equal to or less than 30 nm in order to decrease the back transfer. In the present invention, because the backcoat layer can be made thinner, sufficient sliding durability can be secured by mere addition of an additive in a small amount.

As the aromatic organic oxidation compound, phenyl sulfonic acid is preferred. The amount used ranges from 0.03 to 10 parts by weight, preferably from 0.5 to 5 parts by weight with respect to 100 parts by weight of the total amount of the granulated oxide and carbon black.

As the organic powder, acryl-styrene copolymer based resin powders, benzoacnamine resin powders, melamine based resin powders, phthalocyanine based pigments and the like can be exemplified.

Because the magnetic recording medium of the present invention has high adhesion between a flexible support and a backcoat layer, the running durability has been improved compared with conventional magnetic recording media which utilize a binder having a high glass transition temperature. In addition, cupping and coiling can be also lowered by adjusting the glass transition temperature and thickness of the backcoat layer of the magnetic recording medium of the present invention. The glass transition temperature of the backcoat layer preferably ranges from 60 to 120° C. and the drying thickness usually ranges from about 0.2 to 1 μm, preferably from 0.2 to 0.6 μm. If the magnetic recording medium of the present invention has a tape shape, the backcoat layer hardly transfers to the magnetic layer even if it is wound with a high tension and then preserved. Therefore, it is possible to make the thickness of the medium in the range of from about 4 to 9 μm.

The ferromagnetic powder used in the magnetic layer of the magnetic recording medium of the present invention is ferromagnetic iron oxide, a cobalt containing ferromagnetic iron oxidem barium ferrite powder, a ferromagnetic metal powder or the like. The ferromagnetic powder has a $S_{BET}$ (BET specific surface area) ranging from 40 to 80 m$^2$/g, preferably from 50 to 70 m$^2$/g. The crystallite size ranges from 13 to 22 nm, especially preferably14 to20 nm. The length of the major axis ranges from 0.05 to 0.25 μm, preferably from 0.07 to 0.2 μm, especially preferably from 0.08 to 0.15 μm. The pH of the ferromagnetic powder is preferably equal to or higher than 7. As the ferromagnetic powder, a simple substance or an alloy of Fe, Ni, Fe—Co, Fe—Ni, Co—Ni, Co—Ni—Fe or the like can be exemplified, and which may contain aluminum, silicon, sulfur, scandium, titanium, vanadium, gold, tin, antimony, boron, barium, tantalum, tungsten, rhenium, silver, lead, phosphorus, lantern, cerium, praseodymium, neodymium, tellurium, bismuth or the like in the range equal to or less than 20% by weight of the metal component(s). In addition, the ferromagnetic metal powder may contain a small amount of water, a hydroxide or an oxide. Methods for preparation of these ferromagnetic powders have already been known publicly and the ferromagnetic powder used in the present invention can be prepared according to such publicly known methods.

The shape of the ferromagnetic powder is not especially limited, however, those having an acicular shape, granulated shape, cubical shape, rice grain shape and plate shape are used. It is especially preferable to use an acicular ferromagnetic powder.

In the present invention, a binder, a hardening agent and a ferromagnetic powder are mixed and dispersed together with a solvent, such as methyl ethyl ketone, dioxane, cyclohexane, ethyl acetate or the like which are usually used in preparing magnetic paints, and then the mixture is used as a paint for forming a magnetic layer. The mixing and dispersing can be done according to usual methods.

The paint for forming a magnetic layer may contain, in addition to the above-mentioned components, an additive or filler which is usually used, such as an abrasive such as $\alpha\text{-}Al_2O_3$, $Cr_2O_3$ or the like, an antistatic agent such as carbon black, a lubricant such as a fatty acid, a fatty acid ester, a silicone oil or the like, a dispersant or the like.

Next, a lower nonmagnetic layer or lower magnetic layer will be explained in detail, which is a part of a multilayer structure of the present invention.

The inorganic powder used in the lower layer of the present invention may be a magnetic powder or a nonmagnetic powder. For example, in the case of a nonmagnetic powder, it can be selected from inorganic compounds and nonmagnetic metals, such as metal oxides, metal carbonates, metal sulfates, metal nitrides, metal carbides, metal sulfides or the like.

As the inorganic compounds, for example, titanium oxides ($TiO_2$, $TiO$), $\alpha$-alumina having an $\alpha$-conversion rate ranging from 90 to 100%, $\beta$-alumina, $\gamma$-alumina, $\alpha$-iron oxide, chromium oxide, zinc oxide, tin oxide, tungsten oxide, vanadium oxide, silicon carbide, titanium carbide, silicon dioxide, magnesium oxide, zirconium oxide, boron nitride, calcium carbonate, calcium sulfate, barium sulfate, molybdenum disulfide, goethite, aluminum hydroxide, or the like can be used alone or in combination. Titanium dioxide, zinc oxide, iron oxide and barium sulfate are especially preferred and titanium dioxide and iron oxide are further preferred.

As nonmagnetic metals, Cu, Ti, Zn, Al and the like can be exemplified. These nonmagnetic powders preferably have an average particle diameter ranging from 0.005 to 2 $\mu m$. However, the same effect can be obtained by using a combination of nonmagnetic inorganic powders different in a particle size, or one kind of the nonmagnetic inorganic powders with a wide particle diameter distribution, if necessary. Especially preferable is a nonmagnetic powder having an average particle diameter ranging from 0.01 $\mu m$ to 0.2 $\mu m$. The pH of the nonmagnetic powder is especially preferable in the range of from 6 to 9. The specific surface area of the nonmagnetic powder ranges from 1 to 100 $m^2/g$, preferably from 5 to 50 $m^2/g$, further preferably from 7 to 40 $m^2/g$.

The crystallite size of the nonmagnetic powder preferably ranges from 0.01 $\mu m$ to 2 $\mu m$. The oil absorption amount using DBP ranges from 1 to 100 ml/100 g, preferably from 10 to 80 ml/100 g, further preferably from 20 to 60 ml/100 g. The specific gravity ranges from 1 to 12, preferably from 3 to 6. The shape may be any one of an acicular shape, sphere shape, polygon shape, or plate shape.

As soft magnetic powders, granulated Fe, Ni, granulated magnetite, Fe—Si, Fe—Al, Fe—Ni, Fe—Co, Fe—Co—Ni, Fe—Al—Co (sendust) alloy, Mn—Zn ferrite, Ni—Zn ferrite, Mg—Zn ferrite, Mg—Mn ferrite and others described in ("Physics of ferromagnetic material(Two) magnetic characteristics and application" authored by Akinobu Chikakado (published by Shokabou, 1984), 368–376 pages or the like can be exemplified.

The surface of these nonmagnetic powders and soft magnetic powders is preferably subjected to surface treatment as to cover at least a part of them with $Al_2O_3$, $SiO_2$, $TiO_2$, $ZrO_2$, $SnO_2$ $Sb_2O_3$ or ZnO. Among these, $Al_2O_3$, $SiO_2$, $TiO_2$ and $ZrO_2$ give especially excellent dispersibility, and further preferred are $Al_2O_3$, $SiO_2$ and $ZrO_2$. These may be used alone or in combination. In addition, surface-treated layer prepared by coprecipitation may be used in view of the purpose. The surface treatment may be covering with alumina on the surface of nonmagnetic inorganic powder, followed by covering with silica and vice versa. The surface-treated layer may be a porous layer according to the purpose, but it is preferably homogeneous and dense in general.

By mixing carbon black in the lower layer, the surface electric resistance Rs can be lowered, and the desired micro Vickers hardness can be obtained as well. The average particle diameter of the carbon black ranges from 5 nm to 80 nm, preferably from 10 to 50 nm, further preferably from 10 to 40 nm. Specifically, the same carbon black as that can be used in aforementioned backcoat layer can be used.

In the lower layer of the present invention, a magnetic powder can be used as an inorganic powder. As the magnetic powders, $\gamma\text{-}Fe_2O_3$, Co modified $\gamma\text{-}Fe_2O_3$, an alloy which contains $\alpha$-Fe as a main component, $CrO_2$ and the like are used. A magnetic material used for the lower layer can be selected according to the purpose and effects of the present invention do not depend on kind of the magnetic materials. However, as publicly known, performances are varied between upper and lower layers according to the purpose. For example, it is desirable to set the Hc of the lower magnetic layer lower than the Hc of the upper magnnetic layer in order to improve recording characteristics of long wavelength, as well as it is effective to set the Br of the lower magnetic layer higher than the Br of the upper magnetic layer. Other than them, it is advantageously possible to adopt a publicly known multilayer structure.

As for binders, lubricants, dispersants, additives, solvents, dispersing methods or the like of the lower magnetic layer or lower nonmagnetic layer, those of above-mentioned magnetic layer can be applied. In particular, as for an amount and kind of a binder, an amount added and kind of an additive, a dispersant, the publicly known art for magnetic layers can be applied.

As a flexible support which can be used in the present invention, polyethylene naphthalate (PEN), polyethylene terephthalate (PET), polyamide, polyimide, polyamide imide, aromatic polyamide, polybenzoxydazol and the like which have been subjected to biaxial streching can be exemplified. These flexible supports may be subjected beforehand to corona discharge treatment, plasma treatment, treatment for enhancing adhesion, heat treatment or the like. The flexible support which can be used in the present invention preferably have a centerline average surface roughness within the range of from 0.1 to 20 nm, preferably from 1 to 10 nm at a cutoff value of 0.25 mm and the surface preferably has excellent smoothness. In addition, it is preferable that not only these flexible supports have small centerline surface roughness but also they have no coarse projection having a size equal to or higher than 1 μm.

The thickness of the flexible support ranges from 1 to 15 μm, preferably from 4 to 9 μm. If it is thin, unevenness of the backcoat layer becomes easy to transfer by handling tension. However, this can be effectively prevented by using the above-mentioned polyurethane resin on the most upper layer. If the thickness is equal to or less than 7 μm, it is preferable to use an aromatic polyamide such as PEN or aramid.

In the present invention, it is especially preferable to use an aramid base as a flexible support.

The aramid base used in the present invention is such a film base as obtained by forming a film with an aromatic polyamide. It is such a substance as containing equal to or more than 50 mol % of those represented by the general formula;

$$—NHCO—Ar_1—CONH—Ar_2$$

(wherein $Ar_1$ and $Ar_2$ represent divalence organic groups containing at least one aromatic ring and the carbon number preferably ranges from 6 to 25); or $$—CO—Ar_3—NH—$$

(wherein $Ar_3$ represents a divalence organic group containing at least one aromatic ring and the carbon number preferably ranges from 6 to 25). For example, those consisting of paraphenylene terephthalamide, paraphenylene isophthalamide, metaphenylene terephthalamide, metaphenyl isophthalamide or the like can be exemplified. Moreover, those containing halogens (such as chlorine, bromine, fluorine or the like) or substituents such as nitro groups, alkyl groups, alkoxy groups or the like in a phenyl nucleus are included. In this aromatic polyamide, those mainly containing paraphenylene terephthalamide are more preferable. Those containing a chlorine substituent in a phenyl nucleus have high mechanical strength, high modulus of elasticity and low moisture absorption, moreover, they have excellent heat resistance and good mechanical and thermal dimensional stabilities. Therefore, they are suitable as materials for good high-density recording media.

As monomers which constitute the aromatic polyamide having the above-mentioned structure, in the case of polymer synthesis from an acid chloride and a diamine, terephthalic acid chloride, 2-chloro terephthalic acid chloride, 2,6-dichloro isophthalic acid chloride, 2-bromo terephthalic acid chloride, 2-methyl-5-chloro terephthalic acid chloride, paraphenylene diamine, 2-chloro paraphenylene diamine, metaphenylene diamine or the like can be exemplified.

The aforementioned aromatic polyamides are disclosed in Japanese Unexamined Patent Publication (KOKAI) Heisei No.8-55327 or Japanese Unexamined Patent Publication (KOKAI) Heisei No.8-55328. In addition, they can be also obtained from commercially available products. Mictron (manufactured by Toray Industries, Inc.) or Aramica (manufactured by Asahi Chemical Industry Co., Ltd.) or the like can be exemplified.

The thickness of the aramid base used in the present invention generally ranges from 1.0 to 10 μm, preferably from 2.0 to 6.0 μm, further preferably from 3.0 to 5.0 μm.

The shape of the flexible support is generally determined corresponding to the shape of the magnetic recording medium to be produced. Because the shape of the magnetic recording medium of the present invention can be determined optionally, that having any shape of a tape, a disc, a sheet, a card or the like can be widely used as the flexible support.

The magnetic recording medium of the present invention preferably has the adhesion strength between a flexible support and a backcoat layer equal to or higher than 80 g/(8 mm width). The conventional magnetic recording medium in which an aramid base is used as a flexible support has problems that the backcoat layer comes off in repeatedly running or projections on the surface of the backcoat layer transfer to the magnetic layer resulting in lowering the output. The present inventors have diligently studied about the reasons, and as a result, it has been found that it is caused by weak adhesion strength between the backcoat layer and the aramid base. They have studied about magnetic recording media having various adhesion strength, and then they established that magnetic recording media which are excellent in both electromagnetic characteristics and running stability can be prepared if the adhesion strength between the aramid base and the backcoat layer is equal to or higher than 80 g/(8 mm width). It is to be noted that the adhesion strength can be measured according to the method described in examples mentioned below.

The magnetic recording medium of the present invention can be prepared, for example, by coating paints on the surface of the flexible support during running as to have the layer thickness after dried within the certain range mentioned above or vapor depositing. Several magnetic paints or nonmagnetic paints can be coated sequentially or simultaneously with multilayer coating. As coating machines for coating magnetic paints, air doctor coat, blade coat, rod coat, extrusion coating, air knife coat, Squeeze coat, impregnated coat, reverse roller coat, transfer roller coat, gravure coat, kiss coat, cast coat, splay coat, spin coat or the like can be utilized. As for these, for example, "The latest coating art" published by Sogo Gijyutu Center Co. Ltd. (May 31st, 1983) can be referred to.

In producing a magnetic recording medium having two or more layers on one side, for example, the following method can be used.

1. A lower layer is first applied using a coating apparatus commonly used for magnetic paint coating, e.g., a gravure, roller, blade, extrusion or the like, and an upper layer is then applied, before the lower layer is dried, by means of a support-pressing extrusion coating apparatus such as those disclosed in Japanese Patent Publication (KOKOKU) Heisei No. 1-46,186, Japanese Unexamined Patent Publication (KOKAI) Showa No. 60-238,179 and Japanese Unexamined Patent Publication (KOKAI) Heisei No. 2-265,672 or the like.

2. Upper and lower layers are applied almost simultaneously using a single coating head having two slits for passing coating liquids, such as those disclosed in Japanese Unexamined Patent Publication (KOKAI) Showa No. 63-88080, Japanese Unexamined Patent Publication (KOKAI) Heisei No. 2-17971, and Japanese Unexamined Patent Publication (KOKAI) Heisei No. 2-265672.

3. Upper and lower layers are applied almost simultaneously using an extrusion coating apparatus with a backup roller as disclosed in Japanese Unexamined Patent Publication (KOKAI) Heisei No. 2-174965.

The backcoat layer can be prepared by coating a paint for forming a backcoat layer in which a granulated component(s) such as an abrasive, a lubricant or an antistatic agent and a binder are dispersed in an organic solvent on the side opposite to the magnetic layer. As seen in the aforementioned preferred embodiments, because sufficient dispersibility can be secured if the amount used of the granulated oxide used is larger than that of carbon black, a paint for forming a backcoat layer can be prepared without roller kneading which was conventionally required. In addition, if the ratio of carbon black content is low, the amount of residual cyclohexanone after dried can be reduced even if cyclohexanone is used as a solvent.

The magnetic layer coated is dried after a ferromagnetic powder contained in the magnetic layer is subjected to magnetic field orientation treatment. The magnetic field orientation treatment can be properly done by methods which are widely known by those skilled in the art.

The magnetic layer is subjected to surface smoothing treatment using a super calender roller or the like after dried. By the surface smoothing treatment, voids generated by removing a solvent in drying are disappeared, and thereby the filling density of the ferromagnetic powder in the magnetic layer is improved. Therefore, magnetic recording media having high electromagnetic characteristics can be obtained.

As calender processing rollers, heat-resistant plastic rollers such as polyimide, polyamide, polyamideimide are used. In addition, the process may also be carried out with metal rollers.

The magnetic recording medium of the present invention preferably has a surface having good smoothness. In order to obtain good smoothness, for example, as mentioned above, it is effective that the magnetic layer formed with a selected binder is subjected to the aforementioned calender process. The calender process is carried out at a calender roller temperature ranging from 60 to 100° C., preferably from 70 to 100° C., especially preferably from 80 to 100° C. and under a pressure ranging from 100 to 500 kg/cm, preferably from 200 to 450 kg/cm, especially preferably from 300 to 400 kg/cm. The magnetic recording medium thus obtained can be used after cutting out to a desirable size using cutting machines or the like. The magnetic recoding medium passed through the calender process is generally subjected to heat treatment.

Recently, for linearity of high-density magnetic recording media (securing off track margins), it is emphasized to lower the thermal shrinkage rate. In particular, along with narrowing tracks, it is required to suppress the shrinkage rate in a MD direction (longitudinal direction) equal to or less than 0.7%. As means for reducing the thermal shrinkage rate, used are a method in which heat treatment is done on the web while handling at a low tension, and a method in which a tape is heat treated in a laminated form, such as in the case of a bulk or a tape is built in a cassette (thermo-treatment). In the former case, the gravity that unevenness of a back surface transfers is small but it is not possible to decrease the thermal shrinkage rate to a large extent. Although it changes a little by varying annealing temperature, retaining time, tape thickness and handling tension, the thermal shrinkage rate at 70° C. after 48 hours cannot exceed the range of from 0.1 to 0.12%. The thermal shrinkage rate can be remarkably improved by using the latter thermo-treatment. However, since unevenness of the back surface fairly transfers to the magnetic layer, the surface of the magnetic layer becomes rough to lower the output and increase a noise.

If the construction of the magnetic recording medium of the present invention is adopted, since formation having high elasticity and being hard to remain plastic deformation can be accomplished, the magnetic recording medium having a high output and a low noise can be provided especially with the magnetic recording medium subjected to the thermo-treatment. This is especially remarkable in the case of using the above-mentioned polyurethane resin.

The thermal shrinkage rate in a MD direction at 70° C. after 48 hours of the magnetic recording medium of the present invention is equal to or less than 0.12%. A load having a weight of 0.2 g was hung on one side of a tape piece having a size of 8 mm width×10 cm, preserving it in a circumstance of 70° C. for 48 hours, then a tape length changing amount after preservation was divided by a tape length before preservation. Thereby this thermal shrinkage rate was obtained.

In the magnetic recording medium of the present invention, because it is possible to make a surface of the backcoat layer smooth, it is possible to adjust the friction coefficient of the backcoat layer at a suitable value. Thereby, the friction coefficient between the backcoat layer and the magnetic layer becomes higher, so that a tape rolling figure on a roller, a slit pancake and a built-in reel is good even if high-speed handling is done in producing the magnetic recording medium. Similarly, a tape rolling figure on a reel after video cassette recorder (VCR) is fed rapidly or rewound is also good.

In the followings, constructions and effects of the present invention will be more specifically explained in reference to Examples. Materials, an amount used, operating procedures, operating conditions and the like can be properly changed as long as not deviating from the aim. Accordingly, the scope of the present invention is not limited to specific examples described in Examples below.

EXAMPLE

Example 1

The magnetic recording media 1 to 14 which were different in a content of a granulated oxide in the backcoat layer were produced and their characteristics were compared.

In these examples, those described in Table 1 were used as a polyurethane resin. In addition, "parts" represents "parts by weight" in the following description.

TABLE 1

| Kind | Contents [Structure] | mol |
|---|---|---|
| A | Number average molecular weight: 36,000, Tg: 94° C. | |
| | Hydrogenated bisphenol A | 0.6 |
| | Polypropylene oxide adduct of bisphenol A | 0.3 |
| | Sodium salt of bis(2-hydroxyethyl)5-sulfoisophthalate | 0.05 |
| | Diphenylmethane diisocyanate | 1.0 |
| | Trimethylol propane | 0.05 |
| | —$SO_3Na$ groups ($6.0 \times 10^{-5}$ eq/g) | |
| B | Number average molecular weight: 40,000, Tg: 38° C. | |
| | Neopentyl glycol | 2.5 |
| | Hydroxy caproic acid | 3.1 |
| | Phthalic acid | 2.8 |
| | Diphenylmethane diisocyanate | 1.0 |
| | —$SO_3Na$ groups ($6.5 \times 10^{-5}$ eq/g) | |
| C | Number average molecular weight: 13,000, Tg: 33° C. | |
| | Butane diol | 1.7 |
| | Neopentyl glycol | 0.6 |

TABLE 1-continued

| Kind | Contents [Structure] | mol |
|---|---|---|
| | Adipic acid | 1.3 |
| | Diphenylmethane diidocyanate | 1.0 |

[Preparation of Coating Liquid for Magnetic Layer]

After kneading and dispersing each of components mentioned below, a coating liquid for a magnetic layer was prepared by filtrating with a filter having an average pore diameter of 1 μm.

TABLE 2

| | Parts by weight |
|---|---|
| Ferromagnetic metal powder (Fe—CO alloy) (Note 1) | 100 |
| Phenyl phosphonic acid | 3 |
| Polyurethane resin A (described in table 1) | 4.5 |
| Vinyl chloride resin (Nippon Zeon: MR110) | 9 |
| Carbon Black (Average particle diameter: 80 nm) | 1 |
| Alumina (Average particle diameter: 0.2 μm) | 5 |
| Stearic acid (SA) | 0.5 |
| Butyl stearate (BS) | 1.2 |
| Polyisocyanate (Coronate L manufactured by Nippon polyurethane Co. Ltd.) | 4.5 |
| Methylethyl ketone | 120 |
| Cyclohexanone | 120 |

(Note 1)
Co content: 30% by weight,
Al content: 5% by weight,
Y content: 5% by weight,
Hc: 2350 Oe
$\delta_s$: 145 emu/g,
$S_{BET}$: 50 m$^2$/g,
Length of major axis: 0.1 μm,
Crystallite size: 175 Å,
pH: 9

[Preparation of Coating Liquid for Nonmagnetic Layer]

After kneading and dispersing each of components mentioned below, a coating liquid for a nonmagnetic layer was prepared by filtrating with a filter having an average pore diameter of 1 μm.

TABLE 3

| Components | Parts by weight |
|---|---|
| Nonmagnetic powder TiO$_2$ (Note 1) | 100 |
| Phenyl phosphonic acid | 3 |
| Polyurethane resin A (described in table 1) | 6 |
| Vinyl chloride resin (Nippon Zeon: MR110) | 12 |
| Carbon Black (Average particle diameter: 20 nm) | 15 |
| Alumina (Average particle diameter: 0.2 μm) | 10 |
| Stearic acid (SA) | 0.5 |
| Butyl stearate (BS) | 1.2 |
| Polyisocyanate (Coronate L manufactured by Nippon polyurethane Co. Ltd.) | 6 |
| Methylethyl ketone | 120 |
| Cyclohexanone | 120 |

(Note 1)
Average particle diameter: 35 nm,
$S_{BET}$: 40 m$^2$/g,
Surface treatment with Al,
TiO$_2$ content: equal to or higher than 90% by weight,
pH: 7.5

[Preparation of Coating Liquid for Backcoat Layer]

Each of coating liquids for a backcoat layer used for preparation of magnetic recording media 1 to 14 was prepared according to the following methods.

After kneading components other than a hardening agent described in Table 4 with 120 parts by weight of methylethyl ketone and 120 parts by weight of cyclohexanone, the resulted mixture was dispersed with a sand mill. A hardening agent (polyisocyanate) in such an amount as described in Table 4 and 1500 parts by weight of methylethyl ketone were added to the dispersion thus obtained, followed by filtration with a filter having an average pore diameter of 1 μm to obtain a coating liquid for a backcoat layer.

TABLE 4

| | Powder | | | | | | | |
|---|---|---|---|---|---|---|---|---|
| | Granulated oxide | | | | Carbon black | | | |
| | Titanium oxide | α-hematite Length of major | | | | | | |
| magnetic recording medium No. | (Particle diameter: 35 nm, sphere) | axis: 150 nm Length of minor axis: 20 nm | Calcium Carbonate | Carbon black (15 nm) | Carbon black (20 nm) | Carbon black (80 nm) | Carbon black (250 nm) |
| 1 (Present invention) | 85 | — | — | — | 15 | — | — |
| 2 (Present invention) | 85 | — | — | — | 14 | 1 | — |
| 3 (Present invention) | 85 | — | — | — | 12 | 3 | — |
| 4 (Present invention) | 85 | — | — | — | 12 | 3 | — |
| 5 (Present invention) | 85 | — | — | — | 15 | — | — |
| 6 (Present invention) | 85 | — | — | — | 15 | — | — |
| 7 (Present invention) | — | 85 | — | — | 15 | — | — |
| 8 (Present invention) | 65 | — | — | — | 35 | — | — |
| 9 (Present invention) | TTO-S-I (b) 42.5 | 42.5 | — | — | 15 | — | — |
| 10 | — | — | 10 | 97 | — | — | 3 |
| 11 | 50 | — | — | — | — | 50 | — |
| 12 | 95 | — | — | — | — | 5 | — |

TABLE 4-continued

| | | | | | | | |
|---|---|---|---|---|---|---|---|
| 13 | 95 | — | — | — | 5 | — | — |
| 14 | 50 | — | — | — | 50 | — | — |

| | Binder | | | | | | |
|---|---|---|---|---|---|---|---|
| magnetic recording medium No. | Granulated oxide/ Carbon black | Nitro-Cellulose resin | Vinyl Chloride resin | Polyurethane resin A | B | C | Hardening agent | a) content ratio (%) |

| magnetic recording medium No. | Granulated oxide/Carbon black | Nitro-Cellulose resin | Vinyl Chloride resin | Polyurethane A | Polyurethane B | Polyurethane C | Hardening agent | a) content ratio (%) |
|---|---|---|---|---|---|---|---|---|
| 1 (Present invention) | 85/15 | — | 12 | 6 | — | — | 6 | 24 |
| 2 (Present invention) | 85/15 | — | 12 | 6 | — | — | 6 | 24 |
| 3 (Present invention) | 85/15 | — | 12 | 6 | — | — | 6 | 24 |
| 4 (Present invention) | 85/15 | — | — | 18 | — | — | 6 | 24 |
| 5 (Present invention) | 85/15 | — | — | 18 | — | — | 6 | 24 |
| 6 (Present invention) | 85/15 | — | 12 | — | 6 | — | 6 | 24 |
| 7 (Present invention) | 85/15 | — | 12 | 6 | — | — | 6 | 24 |
| 8 (Present invention) | 65/35 | — | 18 | 9 | — | — | 9 | 36 |
| 9 (Present invention) | 85/15 | — | 12 | 6 | — | — | 6 | 24 |
| 10 | 0/100 | 110 | — | — | — | 30 | 20 | 160 |
| 11 | 50/50 | — | 12 | 6 | — | — | 6 | 24 |
| 12 | 95/5 | — | 12 | 6 | — | — | 6 | 24 |
| 13 | 95/5 | — | 4 | 2 | — | — | 2 | 8 |
| 14 | 50/50 | — | 24 | 12 | — | — | 12 | 48 |

| | | Surface treatment agent | | | | |
|---|---|---|---|---|---|---|
| magnetic recording medium No. | Oleic acid | Phenyl phosphonic acid | Abrasive Alumina (0.18 μm) | Lubricant SA | Lubricant BS |
| 1 (Present invention) | — | 3 | 10 | 1 | 1 |
| 2 (Present invention) | — | 3 | 10 | 1 | 1 |
| 3 (Present invention) | — | 3 | 10 | 1 | 1 |
| 4 (Present invention) | — | 6 | — | 1 | 1 |
| 5 (Present invention) | — | 6 | — | 1 | 1 |
| 6 (Present invention) | — | 3 | — | 1 | 1 |
| 7 (Present invention) | — | 3 | — | 1 | 1 |
| 8 (Present invention) | — | 4.5 | — | 1 | 1 |
| 9 (Present invention) | — | 3 | — | 1 | 1 |
| 10 | 1 | — | — | — | 1 |
| 11 | — | 3 | — | 1 | 1 |
| 12 | — | 3 | — | 1 | 1 |
| 13 | — | 3 | — | 1 | — |
| 14 | — | 3 | — | 1 | 1 | a) Binder weight parts/(Weight parts of main powders + Weight parts of carbon black)
b) TTO-S-I (Acicular titanium oxide manufactured by Ishihara Sangyo Co. Ltd., Length of major axis: 75 nm, Length of minor axis: 15 nm)

[Preparation of Magnetic Recording Medium]

A coating liquid for a nonmagnetic layer was coated on a surface of a polyethylene naphthalate support having a thickness of 5.2 μm as to have a thickness after dried of 1.2 μm with a reverse roller. Immediately after this, a coating liquid for a magnetic layer was coated on the nonmagnetic layer as to have a thickness after dried of 0.3 μm with a simultaneous multilayer coating method. While the coating liquid for the magnetic layer was still in a wet state, magnetic field orientation was carried out with a magnet having a magnetic force of 3000 Gauss. Then, a coating liquid for a backcoat layer was coated on the opposite surface of the support as to have a thickness after dried of 0.5 μm with a coil bar coating method. After further dried, it was subjected to calender process by passed through nips of metal rollers to six times with a calender apparatus laminated seven metal rollers (at a speed of 100 m/min., a linear pressure of 300 kg/cm and a temperature of 90° C.). Subsequently, it was wound and subjected to incubation at a temperature of 70° C. for 48 hours. Then, a magnetic recording medium having a tape shape was obtained by slitting it in a width of 8 mm.

[Tests and Measurements]

Characteristics of each of magnetic recording media thus produced were measured.

<Electromagnetic Characteristics>

A 7 MHz signal was recorded and reproduced on each of the magnetic recording media with a VTR (FUJIX8 manufactured by Fuji Photo Film Co. Ltd.), and then the output was measured. The reproduction output was recorded as a relative value which was calculated under the condition that a reproduction output of the magnetic recording medium 10 was considered to be 0 dB. The samples of a bulk core side and bulk outside in the same bulk were measured respectively with respect to ten rolls. The average value of the outputs was calculated and the deviation width was also recorded. In addition, the ratio (C/N) of a carrier output at 7 MHz to a noise at a position with an interval of 0.5 MHz was measured, and then recorded as a relative value utilizing the magnetic recording medium 10 as a standard.

<Friction Coefficient of Backcoat Layer (μ Value)>

A magnetic recording medium was placed across a SUS420J (4 mm φ) at an angle of 180 degrees, and then vibrated with a load of 20 g at a speed of 14 mm/sec. Thus, the friction coefficient was calculated according to the following Euler's equation. The friction coefficient was measured with respect to each of passes before running (1P), after 1000-pass running (1000P) and after 5000-pass running (5000P) in above-mentioned VTR.

$$\mu=(1/\pi)\ln(T_2/20), T_2=\text{sliding resistance value} \qquad (g)$$

<Surface Electric Resistance Rs (Ω/□)>

A sample having a width of 8 mm was placed across two electrodes which had a quadrantal cross section having a radius of 10 mm and which were placed in the 8 mm interval with a digital surface electric resistance meter (TR-8611A manufactured by Takeda Riken Co. Ltd.). Thus, the surface electric resistance Rs was measured.

<Surface Property Ra (nm)>

It was measured with the 3d-MIRAU which measured without contact by an optical interferometry. Specifically, an area Ra having a square of 250 nm was measured with TOPO3D (manufactured by WYKO Co. Ltd.). A spherical compensation and a cylinder compensation were done at a measurement wavelength of 650 nm.

<Glass Transition Temperature (Tg)>

The measurement of glass transition temperature was carried out at an excitation frequency of 110 Hz with RHEOVIBRON DDV-II-A (manufactured by Toyo Boldwin Co. Ltd.).

Measurement results of characteristics of each magnetic recording media were described in Table 5.

the backcoat layer and kind of supports were produced and their characteristics were compared.

[Preparation of Coating Liquid for Magnetic Layer]

After kneading "a" components of a coating liquid for a magnetic layer described in table 6 with an open kneader, followed by dispersion with a sand mill. "b" components were added to the dispersed liquid thus obtained, then "c" components were further added, followed by filtration with a filter having an average pore diameter of 1 μm to obtain a coating liquid for a magnetic layer.

TABLE 6

| Components | | Parts by weight |
|---|---|---|
| a | Ferromagnetic metal powder (Note 1) | 100 |
| a | Vinyl chloride based copolymer (MR-110 manufactured by Nippon Zeon Co. Ltd.) | 1 |
| a | Polyurethane resin A (described in table 1) | 10 |
| a | Phenyl phosphonic acid | 5 |
| a | α-Al$_2$O$_3$ (Average particle diameter: 0.15 μm) | 10 |
| a | Carbon Black (Average particle diameter: 0.08 μm) | 0.5 |
| a | Butyl stearate | 1 |
| a | Stearic acid | 1 |
| a | Methylethyl ketone | 90 |
| a | Cyclohexanone | 30 |
| b | Toluene | 60 |
| c | Polyisocyanate (Coronate L manufactured by | 5 |

TABLE 5

| Magnetic recording medium No. | Electromagnetic characteristics (dB) | | | Friction coefficient | | | Characteristics of backcoat layer | | |
|---|---|---|---|---|---|---|---|---|---|
| | 7M output | C/N | Deviation width | 1P | 1000 p | 1500 p | Rs (Ω) | Ra (nm) | Tg (° C.) |
| 1* | 1 | 1 | 0.2 | 0.22 | 0.25 | 0.30 | 1 × 10$^6$ | 3.5 | 85 |
| 2* | 0.8 | 0.8 | 0.4 | 0.20 | 0.22 | 0.25 | 1 × 10$^6$ | 4 | 85 |
| 3* | 0.5 | 0.5 | 0.6 | 0.18 | 0.19 | 0.21 | 1 × 10$^6$ | 4.5 | 85 |
| 4* | 0.6 | 0.5 | 0.5 | 0.21 | 0.27 | 0.38 | 4 × 10$^6$ | 4 | 95 |
| 5* | 0.9 | 1.0 | 0.2 | 0.23 | 0.25 | 0.28 | 1 × 10$^7$ | 3.2 | 95 |
| 6* | 1.1 | 1.2 | 0.1 | 0.22 | 0.28 | 0.38 | 8 × 10$^5$ | 3.8 | 75 |
| 7* | 1 | 0.9 | 0.3 | 0.25 | 0.28 | 0.35 | 1 × 10$^8$ | 3 | 85 |
| 8* | 0.4 | 0.4 | 0.4 | 0.18 | 0.30 | 0.40 | 1 × 10$^5$ | 8 | 85 |
| 9* | 0.8 | 0.8 | 0.5 | 0.23 | 0.26 | 0.34 | 1 × 10$^7$ | 3.5 | 85 |
| 10 | 0 | 0 | 1.5 | 0.18 | 0.28 | 0.38 | 2 × 10$^6$ | 6 | >120 |
| 11 | −0.5 | −0.5 | 1.0 | 0.15 | (>0.6) | (—) | 5 × 10$^4$ | 18 | 85 |
| 12 | 0.5 | 0.5 | 0.5 | 0.26 | 0.32 | 0.40 | 1 × 10$^{11}$ | 3 | 85 |
| 13 | 0.2 | 0.2 | 1.0 | 0.17 | (>0.6) | (—) | 5 × 10$^{10}$ | 11 | 84 |
| 14 | −0.3 | −0.3 | 0.8 | 0.17 | 0.55 | (>0.6) | 3 × 10$^5$ | 11 | 85 |

*: Present invention

The results described in Table 5 showed that electromagnetic characteristics, running durability and characteristics of the backcoat layer of magnetic recording media 1 to 9 of the present invention are more excellent than those of the magnetic recording medium 10 in which titanium oxide and α-iron oxide are not contained in the backcoat layer, the magnetic recording media 11 to 14 in which the content ratio of a granulated oxide to carbon black in the backcoat is out of the range of the present invention, and the magnetic recording media 13 and 14 in which a binder amount in the backcoat layer is out of the range of the present invention.

Example 2

The magnetic recording media 15 to 19 which were different in the adhesion strength between the support and TABLE 6-continued

| Components | Parts by weight |
|---|---|
| Nippon Polyurethane Co. Ltd.) Mixed solvent of Methylethyl ketone/Cyclohexanone (1/1) | 40 |

(Note 1)
Fe/Co = 70/30,
Hc: 2370 Oe
Specific surface area by BET method: 8 m$^2$/g,
Crystallite size: 160 Å,
Surface treatment agent: Al$_2$O$_3$ and Y$_2$O$_3$,

TABLE 6-continued

| Components | Parts by weight |
|---|---|
| Particle size (length of major axis): 0.1 µm, | |
| Acicular ratio: 6, | |
| σs: 154 emu/g | |

[Preparation of Coating Liquid for Nonmagnetic Layer]

After kneading "d" components of a coating liquid for a nonmagnetic layer described in table 7 with an open kneader, the resulted mixture was dispersed with a sand mill. "e" components were added to the dispersed liquid thus obtained, then "f" components were further added, followed by filtration with a filter having an average pore diameter of 1 µm to obtain a coating liquid for a magnetic layer.

TABLE 7

| Component | | Parts by weight |
|---|---|---|
| d | Nonmagnetic powder (Note 1) | 80 |
| d | Carbon black (Note 2) | 20 |
| d | Vinyl chloride based copolymer | 10 |
| d | Polyurethane resin A (described in table 1) | 5 |
| d | Phenyl phosphonic acid | 3 |
| d | α-Al$_2$O$_3$ (Average particle diameter: 0.2 µm) | 1 |
| d | Butyl stearate | 1 |
| d | Stearic acid | 1 |
| d | Ethylethyl ketone | 100 |
| d | Cyclohexanone | 50 |
| d | Toluene | 50 |
| e | Polyisocyanate (Coronate L manufactured by Nippon Polyurethane Co. Ltd.) | 5 |
| f | Mixed solvent of Methylethyl ketone/Cyclohexanone (1/1) | 40 |

(Note 1)
α-Fe$_2$O$_3$ hematite,
Length of major axis: 0.15 µm,
Specific surface area by BET method: 52 m$^2$/g,
pH: 8,
Tap density: 0.8,
DBP oil absorption amount: 27–38 g/100 g
Surface covering compound: Al$_2$O$_3$ and SiO$_2$
(Note 2)
Average primary particle diameter: 16 µm,
DBP oil absorption amount: 120 ml/100 g,
pH: 8.0,
Specific surface area by BET method: 250 m$^2$/g,
Volatile content: 1.5%

[Preparation of Coating Liquid for Backcoat Layer]

After kneading g components of a coating liquid for a nonmagnetic layer described in table 7, the resulted mixture was dispersed with a sand mill. "h" components were added to the dispersed liquid thus obtained, followed by filtration with a filter having an average pore diameter of 1 µm to obtain a coating liquid A for a nonmagnetic layer. This paint was used as a coating liquid for a backcoat layer for the magnetic recording media 15 to 17.

TABLE 8

| Components | | Parts by weight |
|---|---|---|
| g | Carbon black (particle diameter: 20 nm) | 12 |
| g | Carbon black (particle diameter: 80 nm) | 3 |
| g | Titanium oxide (particle diameter: 35 nm, sphere) | 85 |

TABLE 8-continued

| Components | | Parts by weight |
|---|---|---|
| g | Vinyl chloride resin (MR110) | 12 |
| g | Polyurethane resin A (described in table 1) | 6 |
| g | Phenyl phosphonic acid | 3 |
| g | Alumina (particle diameter: 0.18 µm) | 10 |
| g | Stearic acid | 1 |
| g | Butyl stearate | 1 |
| g | Methylethyl ketone | 60 |
| g | Cyclohexanone | 180 |
| h | Polyisocyanate | 5 |
| h | Cyclohexanone | 80 |

After kneading "i" components of a coating liquid for a nonmagnetic layer described in table 7, the resulted mixture was dispersed with a sand mill. "j" components were added to the dispersing liquid thus obtained, then "k" components were further added, followed by filtration with a filter having an average pore diameter of 1 µm to obtain a coating liquid B for a nonmagnetic layer. This paint was used as a coating liquid for a backcoat layer for the magnetic recording media 18 and 19.

TABLE 9

| Components | | Parts by weight |
|---|---|---|
| i | Carbon black (particle diameter: 15 nm) | 97 |
| i | Carbon black (particle diameter: 250 nm) | 3 |
| i | Nitro cellulose resin | 110 |
| i | Polyurethane resin C (described in table 1) | 30 |
| i | Calcium carbonate | 10 |
| i | Oleic acid | 1 |
| i | Butyl stearate | 1 |
| i | Methylethyl ketone | 60 |
| i | Cyclohexanone | 180 |
| j | Polyisocyanate | 20 |
| k | Methylethyl ketone | 1500 |

[Preparation of Magnetic Recording Medium]

A coating liquid for a nonmagnetic layer was coated on a surface of a flexible support having a thickness of 3.8 µm (which were specified in Tables 10 and 11) as to have a thickness after dried of 1 µm. Immediately after this, a coating liquid for a magnetic layer was coated on the nonmagnetic layer as to have a thickness after dried of 0.15 µm. While the coating liquid for the magnetic layer was still in a wet state, magnetic field orientation was carried out with a magnet having a magnetic force of 3000 Gauss. Further, a coating liquid for a backcoat layer was coated and dried on the opposite surface of the support as to have a thickness after dried of 0.5 µm (with extrusion coating in the case of the magnetic recording media 15 to 17 and with coil bar coating in the case of the magnetic recording media 18 and 19). Subsequently, it was subjected to calender process by passed through nips of metal rollers to six times with a calender apparatus laminated seven metal rollers (at a speed of 100 m/min., a linear pressure of 300 kg/cm and a temperature of 90° C.). Further, it was subjected to incubation at a temperature of 70° C. for 48 hours. Then, a magnetic recording medium having a tape shape was obtained by slitting it in a width of 8 mm.

TABLE 10

| Materials | Young's modulus (kg/mm²) Longitudinal direction | Young's modulus (kg/mm²) Width direction | Surface roughness (nm) Magnetic layer side | Surface roughness (nm) Backcoat layer side |
|---|---|---|---|---|
| Support A | Aramid | 1100 | 1700 | 0.99 | 3.75 |
| Support B | Aramid | 1100 | 1700 | 2.6 | 2.6 |
| Support C | PEN | 500 | 900 | 1.2 | 2.7 |

[Tests and Measurements]

The following adhesion strength measurement, output test and running test were carried out with respect to each of magnetic recording media 15 to 19 thus produced. In addition, the friction coefficient and Ra of the backcoat layer were also measured by the same methods as these of Example 1.

<Adhesion Strength>

As seen in FIG. 1, a tape with an adhesive on both surfaces was affixed on a soft metal plate. Then, a backcoat layer of each magnetic recording medium was affixed as to contact with the tape with an adhesive on both surfaces on it. A magnetic recording medium with a length of 380 mm was prepared and a peeling line was arranged at the position apart 125 mm from its one end. The magnetic recording medium was fold back (180°) as shown in the figure, free ends of a metal plate and a magnetic recording medium were installed to a tension tester, and then they were tensioned at 254 mm/min (where the tensile force was set equal to or higher than 0.10 N). The force at the time was recorded when any parts of the backcoat layer initially came off.

<Output Test>

A 7 MHz signal was recorded and reproduced on each of the magnetic recording media with a VTR (FUJIX8 manufactured by Fuji Photo Film Co. Ltd.), and then the output was measured. The reproduction output was recorded as a relative value which was calculated under the condition that a reproduction output of the magnetic recording medium 18 was considered to be 0 dB.

<Running Test>

Each of the magnetic recording media was subjected to running in 1000 passes with the above-mentioned VTR, and then, the state of guides was observed and evaluated according to the following standards.

○: No stain appeared.

Δ: A little amount of thready cut chips of the backcoat layer adhered on the guides.

X: Thready cut chips of the backcoat layer adhered on the guides.

Testing and measurement results were described in the following table.

TABLE 11

| Magnetic recording medium No. | Under-coat on back side | Optical transmittance concentration (transmittance value measured with TR-927 manufactured by Macbeth Co. Ltd.) | SP | Adhesion strength (g/8 mm width) | Output test result (dB) | Running test result | Friction coefficient of backcoat layer 1 pass | Friction coefficient of backcoat layer 1000 passes | Friction coefficient of backcoat layer 5000 passes | Ra of Back-coat layer (nm) |
|---|---|---|---|---|---|---|---|---|---|---|
| 15* | None | 0.60 | A | 150 | 1.5 | ○ | 0.20 | 0.22 | 0.30 | 3.5 |
| 16* | None | 0.60 | B | 120 | 1.0 | ○ | 0.18 | 0.20 | 0.32 | 2.4 |
| 17* | Used | 0.60 | B | Not peeled | 1.0 | ○ | 0.21 | 0.24 | 0.28 | 2.5 |
| 18 | None | 1.25 | B | 75 | 0 | X | 0.18 | >0.60 | — | 7.0 |
| 19 | None | 1.25 | C | 150 | −1.0 | Δ | 0.18 | 0.26 | 0.52 | 8.0 |

*: Present invention
SP: Support

The magnetic recording media 15 to 17 in which an aramid base was used as a support and the adhesion strength between the backcoat layer and said support was equal to or higher than 80 g/(8 mm width) exhibit high outputs and low Ra and friction coefficient of the backcoat layer as well as no contamination of the guides by running. On the other hand, the magnetic recording medium in which an aramid base was used as a support but the adhesion strength was less than 80 g/(8 mm width) and the magnetic recording medium 19 in which the adhesion strength was sufficiently high but an aramid base was not used as a support were inferior in both electromagnetic characteristics and running durability.

Example 3

The magnetic recording media 20 to 27 which were different in the adhesion strength between the support and the backcoat layer and the thickness of the backcoat layer were produced and their characteristics were compared.

[Preparation of Magnetic Recording Medium]

In producing, the coating liquid for the magnetic layer, the coating liquid for the nonmagnetic layer, the coating liquid A for the nonmagentic layer (which were used for the magnetic recording media 20 to 22) and the coating liquid B for the nonmagentic layer (which was used for the magnetic recording media 23 to 27) which were prepared in Example 2 were used.

A coating liquid for a nonmagnetic layer was coated on a surface of a polyethylene naphthalate support (the Ra of the magnetic layer side: 1.4 nm, the Ra of the backcoat layer side; 3 nm) having a thickness of 5.2 μm as to have a thickness after dried of 1.5 μm. Immediately after this, a coating liquid for a magnetic layer was coated on the nonmagnetic layer as to have a thickness after dried of 0.15 μm. While the coating liquid for the magnetic layer was still in a wet state, magnetic field orientation was carried out with a magnet having a magnetic force of 3000 Gauss, and then dried it. Further, with respect to the magnetic recording media 22 and 24, a 2% polyester solution (FC-13S manufactured by Toyo Boseki Co. Ltd.) in cyclohexanone was coated in an amount of 2 ml/m² on the opposite support surface to the surface provided a nonmagnetic layer and a magnetic layer and dried. A coating liquid for a backcoat layer was coated and dried on it as to have a thickness after dried described in Table 12 (with extrusion coating in the case of the magnetic recording media 20 to 22 and with coil bar coating in the case of the magnetic recording media 23 to 27). Subsequently, it was subjected to calender process by passed through nips of metal rollers to six times with a calender apparatus laminated seven metal rollers (at a speed of 100 m/min., a linear pressure of 300 kg/cm and a temperature of 90° C.). Moreover, it was subjected to thermo-treatment at a temperature of 70° C. for 48 hours. Then, a magnetic recording medium having a tape shape was obtained by slitting it in a width of 8 mm.

[Tests and Measurements]

The adhesion strength measurement, output test, running test, running test, friction coefficient measurement and Ra measurement of the backcoat layer were carried out with respect to each of magnetic recording media 20 to 27 thus produced by the same methods as those of Example 2. However, the output test was recorded as a relative value which was calculated under the condition that a reproduction output of the magnetic recording medium 25 was considered to be 0 dB.

Testing and measurement results were described in the following table.

TABLE 12

| Magnetic recording medium No. | Under coat on back side | Thickness of back coat layer (μm) | Ra (1) (nm) | Optical transmittance concentration (transmittance value measured with TR-927 manufactured by Macbeth Co. Ltd.) | AS (g/ 8 mm width) | OTP (dB) | RTR | Friction coefficient of backcoat layer | | | Ra (2) (nm) |
|---|---|---|---|---|---|---|---|---|---|---|---|
| | | | | | | | | 1 pass | 1000 passes | 5000 passes | |
| 20* | None | 0.4 | 3 | 0.40 | Not peeled | 0.5 | ○ | 0.18 | 0.19 | 0.25 | 2.5 |
| 21* | None | 0.2 | 3 | 0.24 | 150 | 0.2 | ○ | 0.12 | 0.12 | 0.22 | 4.0 |
| 22* | Used | 0.2 | 3 | 0.24 | Not peeled | 0.2 | ○ | 0.15 | 0.16 | 0.20 | 4.5 |
| 23 | None | 0.2 | 3 | 0.55 | 18 | −1.0 | X | 0.12 | >0.60 | — | 18.0 |
| 24 | Used | 0.2 | 3 | 0.55 | 40 | −1.2 | X | 0.18 | >0.60 | — | 20.0 |
| 25 | None | 0.6 | 3 | 1.60 | 120 | 0 | X | 0.18 | 0.28 | >0.60 | 6.0 |
| 26 | None | 0.3 | 3 | 0.80 | 60 | −0.6 | X | 0.15 | >0.60 | — | 12.0 |
| 27 | None | 0.4 | 5 | 1.00 | Not peeled | −0.5 | Δ | 0.17 | 0.25 | 0.40 | 10.0 |

*: Present invention,
AS: Adhesion strength,
RTR: Running test result
Ra (1): Ra of back side of support,
OTR: Output test result,
Ra (2): Ra of backcoat layer The magnetic recording media 20 to 22 exhibit a low friction coefficient, no contamination of the guides by running and sufficiently high output. On the other hand, the magnetic recording media 23, 24 and 26 in which the thickness of the backcoat layer was within the above-mentioned range but the adhesion strength was less than 80 g/(8 mm width) exhibit a high friction coefficient and Ra of the backcoat layer as well as inferior results of the running tests. In addition, the magnetic recording medium 25 in which the adhesion strength was sufficiently high but the thickness of the backcoat layer exceeded 0.5 μm has a high friction coefficient of the backcoat layer and inferior results of the running tests.

What is claimed is:

1. A magnetic recording medium comprising a magnetic layer on a surface of a flexible support and a backcoat layer on the opposite surface, characterized in that the backcoat layer comprises a spherical or acicular granulated oxide consisting of titanium oxide, α-iron oxide or a mixture thereof and carbon black in the weight ratio ranging from 60/40 to 90/10, and further comprises a binder in an amount ranging from 10 to 40 parts by weight with respect to 100 parts by weight of the total amount of the granulated oxide and carbon black, and the thickness of the backcoat layer ranges from 0.05 to 0.5 μm.

2. The magnetic recording medium according to claim 1, wherein said granulated oxide contained in said backcoat layer has a spherical shape and the particle diameter thereof ranges from 0.01 to 0.2 µm.

3. The magnetic recording medium according to claim 1, wherein said granulated oxide contained in said backcoat layer has an acicular shape, the length of the major axis thereof ranges from 0.05 to 0.3 µm and the length of the minor axis thereof ranges from 0.01 to 0.05 µm.

4. The magnetic recording medium according to any of claim 1, wherein said carbon black contained in said backcoat layer has the particle diameter ranging from 0.01 to 0.3 µm.

5. The magnetic recording medium according to any of claim 1, wherein said backcoat layer comprises a polyurethane resin as a binder, said polyurethane resin being a reactive product of a diol and an organic diisocyanate, said diol consisting of those containing, respectively, a short chain diol having a cyclic structure in an amount ranging from 17 to 40% by weight and a long chain diol having an ether linkage in an amount ranging from 10 to 50% by weight with respect to said polyurethane resin, wherein said ether linkage is contained in said long chain diols in an amount ranging from 1.0 to 5.0 mol/g with respect to said polyurethane resin.

6. The magnetic recording medium according to any of claim 1, wherein the thickness of said backcoat layer is within the range of from 0.1 to 0.3 µm.

7. The magnetic recording medium according to any of claim 1, wherein the surface roughness on the backcoat layer side of said flexible support is equal to or less than 4 nm.

8. The magnetic recording medium according to any of claim 1, wherein said flexible support is an aramid base.

9. The magnetic recording medium according to any of claim 1, wherein the adhesion strength between said backcoat layer and said flexible support is equal to or higher than 80 g/ (8 mm width).

10. The magnetic recording medium according to any of claim 1, to wherein a nonmagnetic layer containing a nonmagnetic inorganic powder and a binder is provided between said flexible support and said magnetic layer.

11. The magnetic recording medium according to any of claim 1, wherein the total thickness is within the range of from 3 to 7.5 µm.

* * * * *